United States Patent
Morris et al.

(10) Patent No.: US 8,489,502 B2
(45) Date of Patent: *Jul. 16, 2013

(54) METHODS AND SYSTEMS FOR MULTI-CREDIT REPORTING AGENCY DATA MODELING

(75) Inventors: Sherri Morris, Lawrenceville, GA (US); Chuck Robida, Roswell, GA (US); Lisa Zarikian, Alpharetta, GA (US)

(73) Assignee: Vantagescore Solutions, LLC, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/046,715

(22) Filed: Mar. 12, 2011

(65) Prior Publication Data

US 2012/0036055 A1    Feb. 9, 2012

Related U.S. Application Data

(63) Continuation of application No. 11/685,066, filed on Mar. 12, 2007, now Pat. No. 7,930,242.

(60) Provisional application No. 60/781,138, filed on Mar. 10, 2006, provisional application No. 60/781,052, filed on Mar. 10, 2006, provisional application No. 60/781,450, filed on Mar. 10, 2006.

(51) Int. Cl.
*G06Q 40/00* (2012.01)
*G06Q 40/02* (2012.01)

(52) U.S. Cl.
CPC .............. *G06Q 40/00* (2013.01); *G06Q 40/025* (2013.01); *G06Q 40/02* (2013.01)
USPC ................................................ 705/38; 705/35

(58) Field of Classification Search
CPC ........ G06Q 40/00; G06Q 40/025; G06Q 40/02
USPC ....................................................... 705/38, 35
See application file for complete search history.

(56) References Cited

U.S. PATENT DOCUMENTS

| | | | |
|---|---|---|---|
| 7,974,919 B2* | 7/2011 | Conlin et al. | 705/38 |
| 2002/0198824 A1* | 12/2002 | Cook | 705/38 |
| 2004/0199456 A1* | 10/2004 | Flint et al. | 705/38 |
| 2005/0004870 A1* | 1/2005 | McGaughey | 705/42 |
| 2005/0086579 A1* | 4/2005 | Leitner et al. | 715/500 |
| 2005/0154664 A1* | 7/2005 | Guy et al. | 705/35 |
| 2006/0178971 A1* | 8/2006 | Owen et al. | 705/35 |
| 2006/0282359 A1* | 12/2006 | Nobili et al. | 705/35 |
| 2007/0112668 A1* | 5/2007 | Celano et al. | 705/38 |

OTHER PUBLICATIONS

The best of the best. (2003). Mortgage Technology, 10(8), 34-53. Retrieved Mar. 28, 2013.*

* cited by examiner

*Primary Examiner* — Kito R Robinson
(74) *Attorney, Agent, or Firm* — Smith Gambrell & Russell LLP

(57) ABSTRACT

Provided are methods and systems by which a data sample can be generated in order to create a true multi-Credit Reporting Agency model, eliminating the biases and variability in traditional multi-CRA models by allowing the creation of a single multi-CRA method which requires neither alignment nor translation to be applicable on all CRAs.

20 Claims, 5 Drawing Sheets

METHODS AND SYSTEMS FOR MULTI-CREDIT REPORTING AGENCY DATA MODELING

CROSS REFERENCE TO RELATED PATENT APPLICATIONS

This application is a continuation of U.S. Utility application Ser. No. 11/685,066 filed Mar. 12, 2007 now U.S. Pat. No. 7,930,242, which claims priority to U.S. Provisional Application No. 60/781,138 filed Mar. 10, 2006, U.S. Provisional Application No. 60/781,052 filed Mar. 10, 2006, and U.S. Provisional Application No. 60/781,450 filed Mar. 10, 2006 herein incorporated by reference in their entireties. Related U.S. Utility application Ser. No. 11/685,070, filed Mar. 12, 2007, by Conlin, et al., entitled "Methods and Systems for Characteristic Leveling" and U.S. Utility application Ser. No. 11/685,061, filed Mar. 12, 2007, by Morris, et al., entitled "Methods and Systems for Segmentation Using Multiple Dependent Variables" are herein incorporated by reference in their entireties.

BACKGROUND

Traditional multi-Credit Reporting Agency (CRA) model developments have involved one of two scenarios:

A) Extracting distinct samples from each CRA at different times and using those samples in separate development efforts, resulting in different algorithms that are then aligned on the back-end to have the same scale, or B) Extracting a single sample from one CRA and using that sample in a mono-CRA development effort, resulting in a single algorithm that is then "translated" to apply to the other CRA's data on the back-end The first of the traditional data design methods involves the developer independently extracting data from potentially different time frames. The data is then used to create independent models that will contain different attributes and different point assignments between the multiple CRAs. The resulting models are then aligned to each other to have the same score range and score-to-odds interpretation.

There are several problems with this data design method. First, the data extracted by each CRA may represent different points in time for each CRA, resulting in a bias whereby seasonality at different points in time of the year is represented by only one of the CRAs. Second, the attributes and associated points that make up the multiple scores are not consistent. This could result in a consumer potentially getting widely different adverse action reason codes between multiple CRAs, even with scores that may be close to each other. Third, score alignment is an exercise that requires estimation, thus introducing additional variability to the aligned score.

The second of the traditional data design methods involves the development of the model using a single CRA's data, then "force-fitting" the remaining CRA's data into the developed model. As with the first method, there are problems with this method as well. First, the model is biased toward the sampling routine used by the contributing CRA's data, as the other CRAs did not contribute to the development data. Second, the attributes in the developed model are biased toward the contributing CRA's data. As such, equitable attribute leveling is not attained because the non-contributing CRA's data is being forced to conform to the contributing CRA, when such conformation may not be possible.

SUMMARY

Provided are methods and systems by which a data sample can be generated in order to create a true multi-CRA model, eliminating the biases and variability in traditional multi-CRA models by allowing the creation of a single multi-CRA methods which requires neither alignment nor translation to be applicable on all CRAs.

As with the development of any product, the use of flawed inputs results in a flawed end product. The common practice by credit grantors of using multiple CRA scores to make credit decisions highlights the need for a CRA-based score that is as "consistent" among the CRAs as possible. Ideally, the score should be based on a single algorithm common to multiple CRAs so that there are no biases or variability due to differences in point assignment for a given credit attribute. Additionally, the score should be based on data from multiple CRAs so that no biases can be attributed to the contribution, sourcing, or timing of the data by any one CRA.

The traditional data design for the development of multi-CRA models does not meet these requirements. Consequently, the meaning of multi-CRA scores developed using this data design is not as "clean" as possible. Credit grantors do not have a tool that can be used to gauge risk with consistency and consumers do not have a score that they can interpret easily amongst multiple CRAs.

The methods provided are preferable to traditional data design for at least the following reasons:

Consistent Seasonality—The extracted data is taken from the same points in time for and by multiple CRAs, eliminating seasonality biases across CRAs.

Ability to Level Attributes—With equal sourcing and representation by each CRA, the attributes can be leveled, eliminating the bias that would be present if only one CRA's attributes were used.

Ability to Create a Single, Composite Scoring Algorithm—With an equal representation of credit data by each CRA, a single scoring algorithm can be created that reflects the combined level of predictive power of the leveled attributes for multiple CRAs (as opposed to the traditional methods's reliance on the predictive power of only one CRA's attributes) resulting in a true multi-CRA model. Additionally, the elimination of the need to scale multiple separate scores to each other removes another source of variability present in the traditional methods.

Ability to Test Stability of Score Performance Across CRAs—With the parallel validation samples described below, the consistency of the score's predictive power across multiple CRAs when using one CRA's attributes with another CRA's performance can be tested and validated. This provides yet another way to ensure the score's "CRA-independent" level of predictive power.

Additional advantages will be set forth in part in the description which follows. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles.

DETAILED DESCRIPTION

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Sourced" means data retrieved from a specific entity.

The present methods and systems may be understood more readily by reference to the following detailed description of preferred embodiments and the Examples included therein and to the Figures and their previous and following description.

I. Methods

Figure 1:
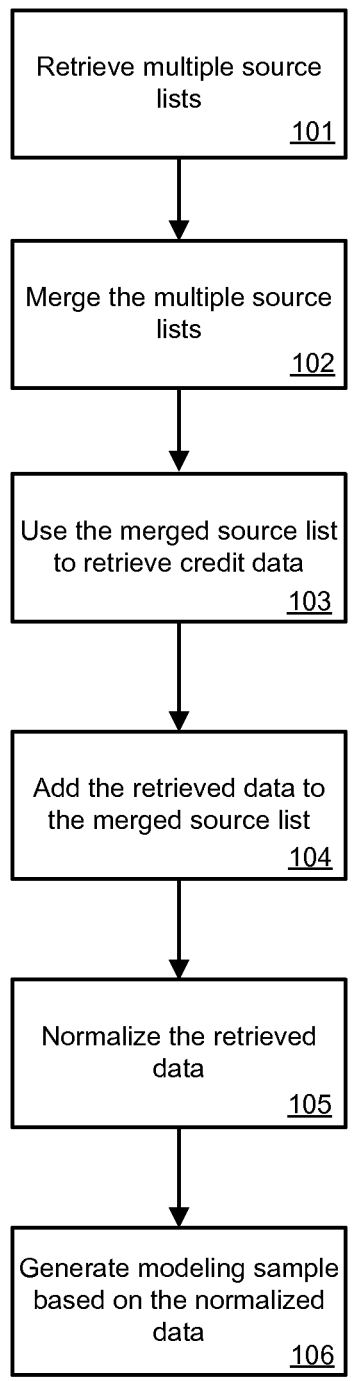
FIG. 1 illustrates exemplary steps in a method for generating a multi-CRA credit data model.

Provided herein are methods for generating true multi-CRA model, which requires neither alignment nor translation to be applicable on all CRAs. An example of the methods is illustrated in FIG. 1. At block 101, multiple source lists can be received. Each CRA can create an X-record source list of consumers with unique sequence number and identification information. The consumers can be randomly selected or from a pre-determined list. A source list refers to the universe of consumers to be used for model development. For example, when developing a custom risk model for a credit data customer, the source list can be a sample of consumers from the customer's portfolio.

For a generic risk model developed at a given CRA (mono-CRA), which is intended for use across applications (including account management, acquisition, collections, etc.) and across customers in different industries (e.g., sub-prime credit card lenders to prime mortgage lenders), the source list can be broad-based. As such, the source list can be a random sample of consumers with credit history. For a multi-CRA risk model, as in the present methods, the process involves repeating the mono-CRA generic risk model data retrieval at all participating CRAs.

At block 102, the source lists from the various CRAs can be merged. If, for example, three CRAs are involved in the methods the resulting source list would be 3× records. Merging of source lists as described herein may or may not be performed literally depending on list sizes and processing capacity, but each CRA, at block 103, will process all records received independently at block 101 regardless of originating CRA.

Figure 2:
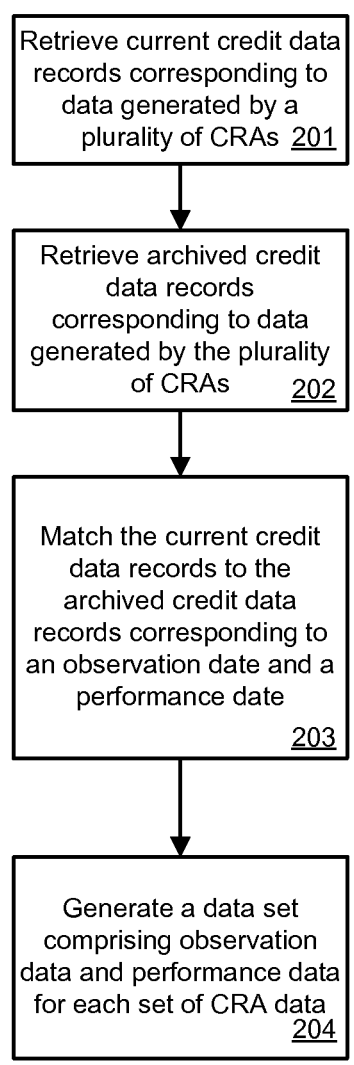
FIG. 2 illustrates exemplary steps in a method for appending observation and performance data to a source list.

At block 103, anonymized raw credit data corresponding to the merged source list is retrieved. This can involve generating credit data corresponding to the merged source list by each CRA. Credit data is retrieved corresponding to a first date, referred to as an observation date and credit data is retrieved corresponding to a second date, referred to as a performance date. The observation date occurs earlier in time than the performance date. This data retrieval results in observation data and performance data. FIG. 2, described below, provides more detail on steps involved in block 103. At block 104, the retrieved credit data is added to the merged source list. For example, the observation data and the performance data retrieved by each CRA can be added to the merged source list. The time span between the observation date and performance date can vary. The time span can be, for example, 6 months, 12 months, 24 months, 36 months, and the like.

The data representing the observation date is used as the predictive information for the development of the scoring model. The data representing the performance date is used as the performance information, or outcome. The model development process uses the observation data to predict the performance data, resulting in a scoring algorithm that assigns the relative likelihood of a consumer, based on the contents of their credit data, to achieve the defined performance under consideration. As an example, the model development process may show that consumers with aggregate bankcard balances of $5000 or greater (as taken from the observation data) are likely to become 90 days or more past due on one of their accounts on their credit file (as shown in the performance data).

FIG. 2 illustrates exemplary steps in a method for appending credit data. Appending utilizes a pre-determined observation date and a pre-determined performance date. At block 201, a CRA can retrieve current credit data for each record of the source list in order to match the consumer (record). Name and address can be sufficient, but SSN can ensure a more accurate match; however, any search method can be used. Matching is done to the consumer's "current" credit file at the searching CRA because the source list was generated from the "current" database of credit data at the other CRAs. Furthermore, if using addresses, addresses from closer points in time can yield better match results.

The "current" database can correspond to data as of the performance date and the "archived" database can correspond to data as of the observation date.

Once the consumer's "current" credit file has been obtained, the consumers "archived" data records can be retrieved at block 202. The "current" record can then be matched back to the consumer's "archived" credit file at block 203 at the agreed upon observation date and performance date. This matching can be performed, for example, by using a proprietary CRA file ID key rather than name, address and SSN since a file ID key is stable over time and can produce more accurate and comprehensive matching. "Archive" matching may be done equally effectively sequentially forwards (observation first, then performance) or backwards (performance first, then observation), or to each archive independently. The use of data from these two points in time can allow a CRA to determine if prior credit classification of a consumer was accurate.

The resultant data is combined into a data set having observation and performance data appended at block 204. Each CRA can perform this appending step independently, resulting in a source list with observation data and performance data generated by each CRA being appended to a final source list.

In the example of three CRAs, at the end of the process, a total of 9× records can be made available:
1. CRA A attributes and performance for CRA A source list
2. CRA A attributes and performance for CRA B source list
3. CRA A attributes and performance for CRA C source list
4. CRA B attributes and performance for CRA A source list
5. CRA B attributes and performance for CRA B source list
6. CRA B attributes and performance for CRA C source list
7. CRA C attributes and performance for CRA A source list
8. CRA C attributes and performance for CRA B source list
9. CRA C attributes and performance for CRA C source list At block 105, the performance data and observation data can be normalized. Because data is available for the same consumers across multiple CRAs at the same time, it is possible to go through an empirical leveling of performance and attributes, as opposed to purely judgmental leveling done when common data is not available.

Leveling, or normalization, is a process that yields consistent and equitable performance and attribute definitions across multiple sources of information. Simply put, this leveling ensures that when the same data is present for multiple sources (here, two or more CRAs) it is interpreted in the same manner keeping in mind that differences in the data itself may still be present. For details on leveling credit data, credit data attributes, and attribute definitions, see U.S. Provisional Patent Application No. 60/781,450, filed Mar. 10, 2006, and U.S. Utility patent application Ser. No. 11/685,070, filed Mar. 12, 2007, entitled "Methods and Systems for Characteristic Leveling" by Conlin et al., both of which are herein incorporated by reference in their entireties.

At block 106, modeling samples, or populations, can be generated. One or more modeling samples can be generated based on the data created. These modeling samples, include but are not limited to, development, validation holdout ("stacked" or "parallel"), and validation ("stacked" or "parallel").

A "stacked" sample, can be a sample wherein the observation data and performance data aggregated at block 104 are utilized from each CRA's source list and then set together (or stacked). In this example, each source list represents one-third of the sample and observation data and performance data come from the same CRA. This type of sample affords the ability to create a single, composite scoring algorithm because there is an equal representation of credit data by each CRA.

Figure 3:
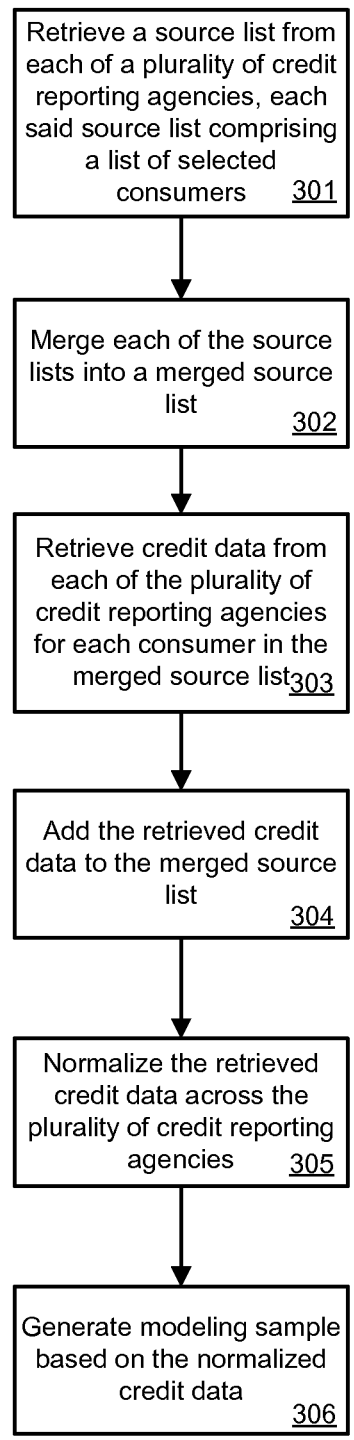
FIG. 3 illustrates exemplary steps in a method for generating a multi-CRA credit data model.

A "parallel" sample, can be a sample wherein the performance data aggregated at block 105 for each CRA's source list is crossed with the observation data in at block 104 for the corresponding consumers from each CRA. So the same performance data for all source lists is "paralleled" in the sample three times, once with each CRA's version of the aggregated attributes. This type of sample affords the ability to test stability of score performance across CRAs for the same source list. In the example of three CRAs, samples can include:
1. "Stacked" development sample chosen from the 3× records comprising:
   CRA A sourced observation data and performance data
   CRA B sourced observation data and performance data
   CRA C sourced observation data and performance data
2. "Stacked" validation (holdout) sample from the 3× records (not in the development sample) comprising:
   CRA A sourced observation data and performance data
   CRA B sourced observation data and performance data
   CRA C sourced observation data and performance data
3. "Parallel" validation sample of 9× records, comprising:
   CRA A sourced performance data and CRA A, B, C observation data
   CRA B sourced performance data and CRA A, B, C observation data
   CRA C sourced performance data and CRA A, B, C observation data FIG. 3 illustrates another embodiment of the methods provided. The method for modeling data can comprise retrieving a source list from each of a plurality of credit reporting agencies at block 301, each said source list comprising a list of selected consumers, merging each of the source lists into a merged source list at block 302, retrieving credit data from each of the plurality of credit reporting agencies for each consumer in the merged source list at block 303, adding the retrieved credit data to the merged source list at block 304, normalizing the retrieved credit data across the plurality of credit reporting agencies at block 305, and generating a modeling sample based on the normalized credit data at block 306.

Retrieving credit data can comprise retrieving credit data for at least one pre-determined date from each of the plurality of credit reporting agencies.

The at least one pre-determined date can comprise a first date and a second date, wherein the first date occurs earlier in time than the second date, resulting in first credit data associated with the first date and second credit data associated with the second date.

Adding the retrieved credit data can comprise associating the first credit data and the second credit data with the merged source list.

Normalizing the credit data can comprise (a) determining at least one characteristic of the credit data, each characteristic having a corresponding characteristic definition assigned by each of at least two of the plurality of credit reporting agencies, (b) reviewing the at least one characteristic and its corresponding characteristic definitions, wherein the reviewing step is performed by at least two of the credit reporting agencies, (c) auditing the at least one characteristic and its corresponding characteristic definitions, wherein the auditing step comprises determining similarities and differences between the characteristic definitions of the at least two respective credit reporting agencies, (d) modifying at least one characteristic definition of the at least one characteristic, wherein the modifying step is performed by at least one of the credit reporting agencies, and (e) repeating the steps of (a), (b), (c) and (d) until the characteristic definition from each of the respective credit reporting agencies provides substantially consistent results.

The methods can further comprise filtering the normalized credit data according to a desired sample. The desired sample can be at least one of a stacked development sample, a stacked validation sample, or a parallel validation sample.

Figure 4:
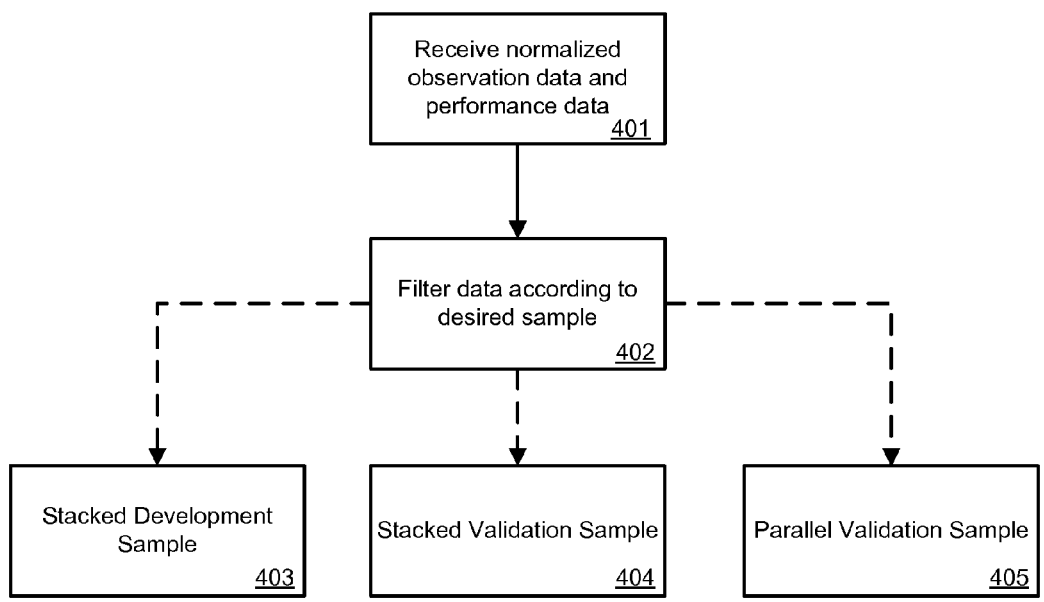
FIG. 4 illustrates exemplary steps in a method for filtering an aggregated and filtered source list.

FIG. 4 illustrates exemplary samples that can be generated as a result of the methods. At block 401, the normalized observation data and performance data are received. The data can be filtered at block 402 according to the desired sample type. Block 403 represents a stacked development sample, block 404 represents a stacked validation sample, and block 405 represents a parallel validation sample.

II. System

Figure 5:
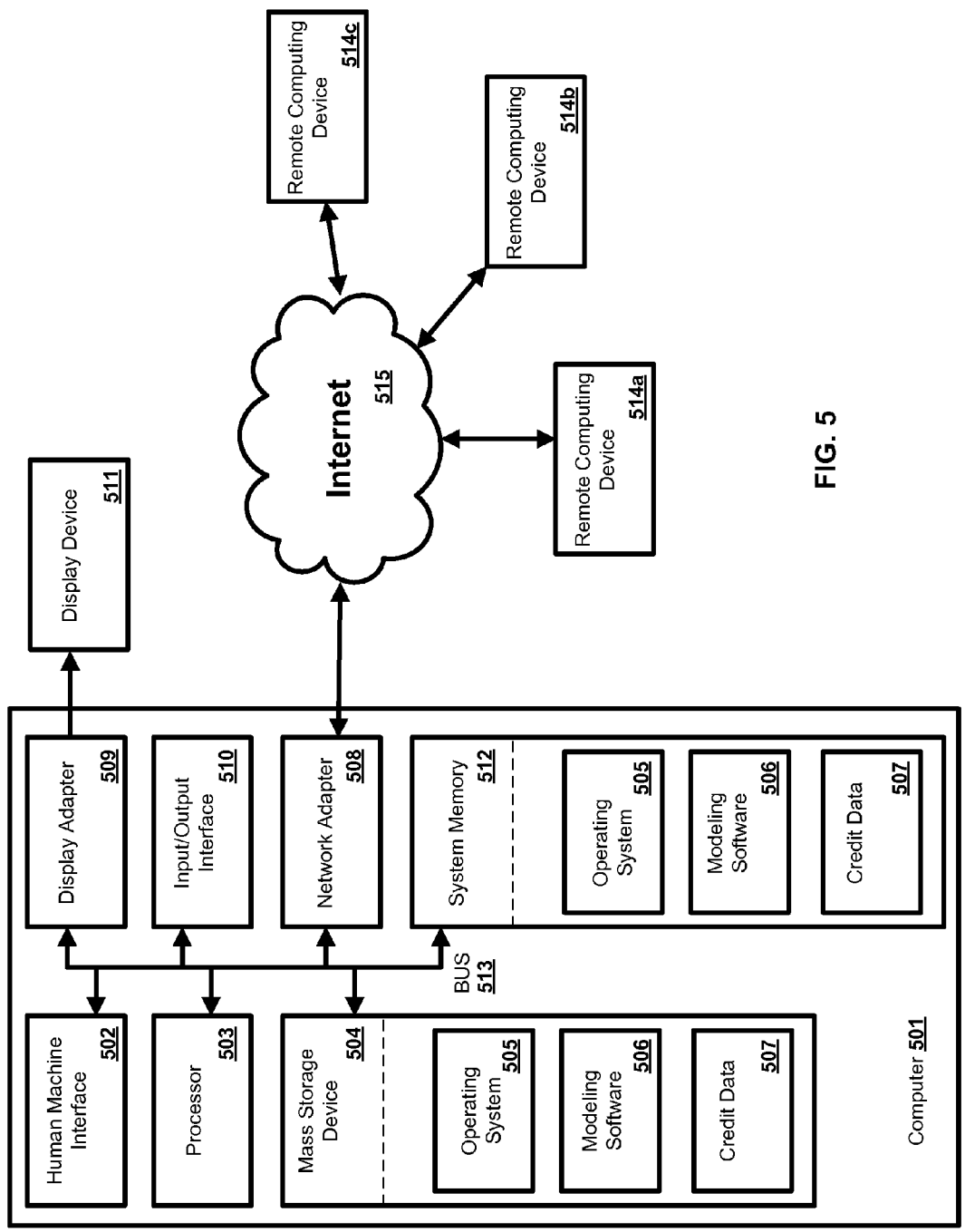
FIG. 5 is an exemplary operating environment.

FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods can be operational with numerous other general purpose or special purpose computing system environments or configurations. Examples of well known computing systems, environments, and/or configurations that may be suitable for use with the systems and methods include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The processing of the disclosed methods can be performed by software components. The disclosed methods may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices. The methods may be practiced utilizing firmware configured to perform the methods disclosed herein in conjunction with system hardware.

The methods and systems provided can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The methods disclosed herein can be implemented via a general-purpose computing device in the form of a computer 501. The components of the computer 501 can include, but are not limited to, one or more processors or processing units 503, a system memory 512, and a system bus 513 that couples various system components including the processor 503 to the system memory 512.

The system bus 513 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 513, and all buses specified in this description can also be implemented over a wired or wireless network connection and each of the subsystems, including the processor 503, a mass storage device 504, an operating system 505, modeling software 506, credit related data 507, a network adapter 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system.

The computer 501 typically includes a variety of computer readable media. Such media can be any available media that is accessible by the computer 501 and includes both volatile and non-volatile media, removable and non-removable media. The system memory 512 includes computer readable media in the form of volatile memory, such as random access memory (RAM), and/or non-volatile memory, such as read only memory (ROM). The system memory 512 typically contains data such as credit related data 507 and/or program modules such as operating system 505 and modeling software 506 that are immediately accessible to and/or are presently operated on by the processing unit 503.

The computer 501 may also include other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 504, including by way of example, an operating system 505 and modeling software 506. Each of the operating system 505 and modeling software 506 (or some combination thereof) may include elements of the programming and the modeling software 506. Credit related data 507 can also be stored on the mass storage device 504. Credit related data 507 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 501 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 503 via a human machine interface 502 that is coupled to the system bus 513, but may be connected by other interface and bus structures, such as a parallel port, game port, or a universal serial bus (USB).

A display device 511 can also be connected to the system bus 513 via an interface, such as a display adapter 509. A computer 501 can have more than one display adapter 509 and a computer 501 can have more than one display device 511. For example, a display device can be a monitor, an LCD (Liquid Crystal Display), or a projector. In addition to the display device 511, other output peripheral devices can include components such as speakers (not shown) and a printer (not shown) which can be connected to the computer 501 via Input/Output Interface 510.

The computer 501 can operate in a networked environment using logical connections to one or more remote computing devices 514*a,b,c*. By way of example, a remote computing device can be a personal computer, portable computer, a server, a router, a network computer, a peer device or other common network node, and so on. Logical connections between the computer 501 and a remote computing device 514a,b,c can be made via a local area network (LAN) and a general wide area network (WAN). Such network connections can be through a network adapter 508. A network adapter 508 can be implemented in both wired and wireless environments. Such networking environments are commonplace in offices, enterprise-wide computer networks, intranets, and the Internet 515.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of modeling software 506 may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems provided have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present methods and systems without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A computer implemented method for modeling data comprising:
   retrieving by a computer a source list from each of a plurality of credit reporting agencies, each said source list comprising a list of selected consumers;
   merging by the computer each of the source lists into a merged source list;
   retrieving by the computer credit data from each of the plurality of credit reporting agencies for each consumer in the merged source list;
   adding by the computer the retrieved credit data to the merged source list;
   normalizing by the computer the retrieved credit data across the plurality of credit reporting agencies; and
   generating by the computer a modeling sample based on the normalized credit data.

2. The method of claim 1, wherein the step of retrieving credit data comprises retrieving by the computer credit data for at least one pre-determined date from each of the plurality of credit reporting agencies.

3. The method of claim 2, wherein the at least one pre-determined date comprises a first date and a second date, wherein the first date occurs earlier in time than the second date, resulting in first credit data associated with the first date and second credit data associated with the second date.

4. The method of claim 3, wherein the step of adding the retrieved credit data comprises associating the first credit data and the second credit data with the merged source list.

5. The method of claim 1, wherein the step of normalizing the credit data comprises:
   (a) determining at least one characteristic of the credit data, each characteristic having a corresponding characteristic definition assigned by each of at least two of the plurality of credit reporting agencies;
   (b) reviewing the at least one characteristic and its corresponding characteristic definitions, wherein the reviewing step is performed by at least two of the credit reporting agencies;
   (c) auditing the at least one characteristic and its corresponding characteristic definitions, wherein the auditing step comprises determining similarities and differences between the characteristic definitions of the at least two respective credit reporting agencies;
   (d) modifying at least one characteristic definition of the at least one characteristic, wherein the modifying step is performed by at least one of the credit reporting agencies; and
   (e) repeating the steps of (a), (b), (c) and (d) until the characteristic definition from each of the respective credit reporting agencies provides substantially consistent results.

6. The method of claim 1, further comprising the step of filtering by the computer the normalized credit data according to a desired sample.

7. The method of claim 6, wherein the desired sample is at least one of a stacked development sample, a stacked validation sample, or a parallel validation sample.

8. A system for modeling data comprising:
   a memory configured for storing credit data;
   a processor, coupled to the memory, wherein the processor is configured to perform the steps of:
      retrieving a source list from each of a plurality of credit reporting agencies, each said source list comprising a list of selected consumers;
      merging each of the source lists into a merged source list;
      retrieving credit data from each of the plurality of credit reporting agencies for each consumer in the merged source list;
      adding the retrieved credit data to the merged source list;
      normalizing the retrieved credit data across the plurality of credit reporting agencies; and
      generating a modeling sample based on the normalized credit data.

9. The system of claim 8, wherein the step of retrieving credit data comprises retrieving credit data for at least one pre-determined date from each of the plurality of credit reporting agencies.

10. The system of claim 9, wherein the at least one pre-determined date comprises a first date and a second date, wherein the first date occurs earlier in time than the second date, resulting in first credit data associated with the first date and second credit data associated with the second date.

11. The system of claim 10, wherein the step of adding the retrieved credit data comprises associating the first credit data and the second credit data with the merged source list.

12. The system of claim 8, wherein the step of normalizing the credit data comprises
 (a) determining at least one characteristic of the credit data, each characteristic having a corresponding characteristic definition assigned by each of at least two of the plurality of credit reporting agencies;
 (b) reviewing the at least one characteristic and its corresponding characteristic definitions, wherein the reviewing step is performed by at least two of the credit reporting agencies;
 (c) auditing the at least one characteristic and its corresponding characteristic definitions, wherein the auditing step comprises determining similarities and differences between the characteristic definitions of the at least two respective credit reporting agencies;
 (d) modifying at least one characteristic definition of the at least one characteristic, wherein the modifying step is performed by at least one of the credit reporting agencies; and
 (e) repeating the steps of (a), (b), (c) and (d) until the characteristic definition from each of the respective credit reporting agencies provides substantially consistent results.

13. The system of claim 8, further comprising the step of filtering the normalized credit data according to a desired sample.

14. The system of claim 13, wherein the desired sample is at least one of a stacked development sample, a stacked validation sample, or a parallel validation sample.

15. A non-transitory computer readable medium with computer executable instructions embodied thereon for modeling data comprising:
 retrieving a source list from each of a plurality of credit reporting agencies, each said source list comprising a list of selected consumers;
 merging each of the source lists into a merged source list;
 retrieving credit data from each of the plurality of credit reporting agencies for each consumer in the merged source list;
 adding the retrieved credit data to the merged source list;
 normalizing the retrieved credit data across the plurality of credit reporting agencies; and
 generating a modeling sample based on the normalized credit data.

16. The non-transitory computer readable medium of claim 15, wherein the step of retrieving credit data comprises retrieving credit data for at least one pre-determined date from each of the plurality of credit reporting agencies.

17. The non-transitory computer readable medium of claim 16, wherein the at least one pre-determined date comprises a first date and a second date, wherein the first date occurs earlier in time than the second date, resulting in first credit data associated with the first date and second credit data associated with the second date.

18. The non-transitory computer readable medium of claim 17, wherein the step of adding the retrieved credit data comprises associating the first credit data and the second credit data with the merged source list.

19. The non-transitory computer readable medium of claim 15, further comprising the step of filtering the normalized credit data according to a desired sample.

20. The non-transitory computer readable medium of claim 19, wherein the desired sample is at least one of a stacked development sample, a stacked validation sample, or a parallel validation sample.

* * * * *